United States Patent [19]

Bricot et al.

[11] 4,157,931
[45] Jun. 12, 1979

[54] PROCESS FOR PRODUCING INFORMATION CARRYING DISCS

[75] Inventors: Claude Bricot; François Le Carvennec; Gérard Robin, all of Paris, France

[73] Assignee: Thomson-Brandt, Paris, France

[21] Appl. No.: 925,881

[22] Filed: Jul. 18, 1978

[30] Foreign Application Priority Data

Jul. 22, 1977 [FR] France .................. 77 22565

[51] Int. Cl.² .................. B29D 17/00; B29C 27/00; B29C 13/00
[52] U.S. Cl. .................. 156/230; 156/242; 156/246; 156/272; 264/22; 264/135; 264/102; 264/106; 264/311; 264/255
[58] Field of Search .......... 264/101, 102, 106, 107, 264/22, 255, 250, 311, 310, 299, 284; 427/54, 294; 156/230, 242, 246, 272, 382

[56] References Cited

U.S. PATENT DOCUMENTS

| | | | |
|---|---|---|---|
| 1,146,391 | 7/1915 | Aylsworth | 264/107 |
| 1,179,660 | 4/1916 | Sanders | 264/107 |
| 2,431,923 | 12/1947 | Dimmick | 427/54 |
| 3,068,510 | 12/1962 | Coleman | 264/22 |
| 3,359,129 | 12/1967 | Mao | 427/54 |
| 3,430,966 | 3/1969 | Gregg | 264/106 |
| 3,639,188 | 2/1972 | Vogel | 156/246 |
| 3,795,534 | 3/1974 | Mehalso et al. | 264/106 |
| 3,882,214 | 5/1975 | Nosker et al. | 264/106 |
| 3,954,469 | 5/1976 | Avanzado et al. | 427/54 |
| 4,054,635 | 10/1977 | Schlesinger et al. | 264/22 |

*Primary Examiner*—W. E. Hoag
*Attorney, Agent, or Firm*—Cushman, Darby & Cushman

[57] ABSTRACT

The process according to the invention uses a matrix engraved by any means, the tracks being perfectly centered on this matrix in relation to a center of rotation. The matrix is placed in a vacuum chamber on a supporting axis capable of rotating and is coated over its entire surface with a polymerizable material which is free from air bubbles and which does not adhere to the constituent material of the matrix. A substrate previously drilled at its center, balanced and coated with a material to which the polymerizable material adheres, is placed on the supporting shaft and held at a distance from the matrix. The vacuum is established in the chamber and the substrate is brought into contact with the matrix. On completion of polymerization outside or inside the chamber, the substrate carrying the moulded resin is readily separated from the matrix.

9 Claims, 2 Drawing Figures

PROCESS FOR PRODUCING INFORMATION CARRYING DISCS

This invention relates to the reproduction of information-carrying discs and, more particularly, to the reproduction of discs on which the information is recorded in the form of a modulation of relief, this modulation constituting the transcription of a two-state coded signal.

One known process for reproducing information discs, on which the information is recorded in the form of a modulation in the relief of the disc, consists in pressing, from a material engraved in duplicate, a disc of thermoplastic material on that matrix. Matrixes of the type in question may be obtained by electrodeposition or may be engraved by local ablation by means of a concentrated recording beam. The pressing process is well suited to the first type of matrixes which are sufficiently hard to withstand the deformations and stresses inherent in the hot-pressing process. By contrast, the matrixes engraved by ablation are difficult to reproduce by this process because they are more fragile, the volatilisable film not being particularly hard. However, they are of interest because their recording may be controlled in real time because there is no development phase.

Another reproduction process, which may be used for reproducing supports from matrixes engraved by ablation, consists in making a copy of moulding. The process consists in coating the matrix (or the support) with a layer of resin (silicone rubber elastomer). A material such as this may be deposited in the form of a very thin layer which does not adhere to the support on which it is deposited. This material is flexible and, hence, capable of being deformed. Accordingly, it has to be fixed on a substrate previously coated with a coupling layer. A first difficulty of this method is to bring the layer of resin and the coupling layer into contact with one another without trapping any air bubbles between the two layers. The support obtained then has to be separated from the matrix and drilled with a hole centered very accurately in relation to the tracks. Finally, the disc has to be balanced so that it is stable relative to the axis of rotation determined beforehand. The first difficulty may be overcome by using a thin, flexible substrate placed in the form of an arc on the layer of resin, contact being made progressively in order to expel the air.

The difficulties associated with centering and balancing can only be partly resolved and the handling involved is in danger of damaging the copy.

The present invention relates to a process for reproducing information-carrying discs by moulding which enables the disadvantages referred to above to be obviated by the use of thin or thick (i.e. flexible or rigid) substrates drilled and balanced beforehand, the process according to the invention not requiring the use of flexible substrates. Moulding is carried out in the absence of heat, which avoids the deformations occurring during hot pressing, and on completion of moulding the hardening of the moulded material may be accelerated for example by heating.

According to the invention, there is provided a process for reproducing information carrying discs from engraved matrixes having centering holes, bring out with a vacuum chamber having a supporting calibrated shaft, said process using substrates in the form of discs having centering holes previously determined, centering holes of said matrixes and said substrates being precisely adjusted to said calibrated shaft and said discs being balanced, said process further using polymerisable material incapable of adhering to said matrixes, coupling material capable of adhering to said substrate and to said polymerisable material, said process comprising a phase during which a substrate is covered with said coupling material to form a first assembly, a phase during which a matrix is covered with said polymerisable material to form a second assembly, said assemblies being placed on said shaft and held at a distance from each other, a phase during which the vacuum is established in said chambers, a phase during which, under vacuum, the assemblies are brought into contact and a phase during which air is admitted in said chamber enabling said contact to be supported, a polymerisation phase and a last phase in which the substrate and the moulded layer of polymerised material adhering to said substrate through said coupling layer is separated from said matrix.

For a better understanding of the present invention and to show how the same may be carried into effect, reference will be made to the following description and the attached drawings among which:

Figure 1:
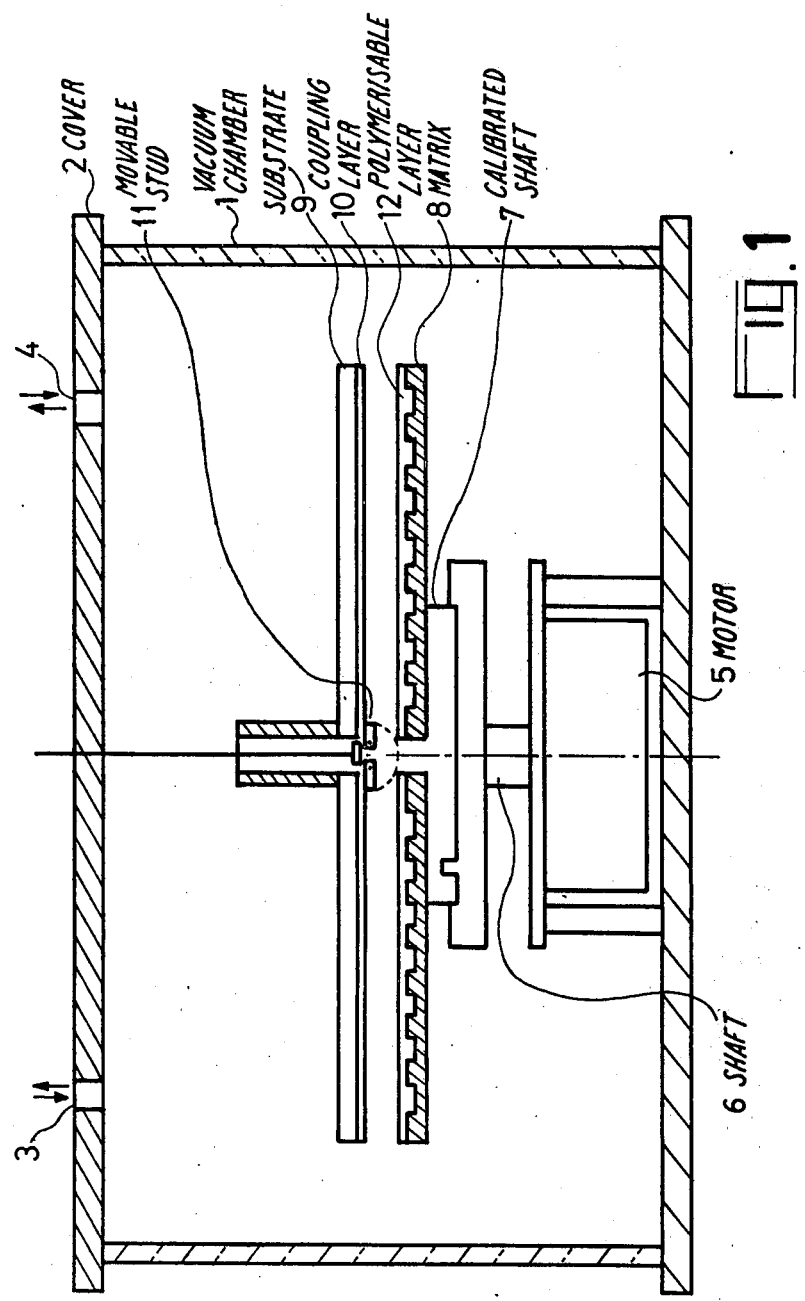
FIG. 1 shows schematically the machine intended for the reproduction of discs and its contents during one stage of the reproduction process according to the invention.

The machine intended for carrying out the process for reproducing information carrying discs as illustrated in FIG. 1 comprises a vacuum chamber 1 with a cover 2 capable of being removed. This cover comprises openings 3 and 4 through which a primary vacuum may be established or through which by contrast it is possible to introduce air.

A motor 5 comprising a shaft 6 capable of being rotated is arranged inside this chamber. A calibrated supporting shaft 7 is rendered integral with the shaft of the motor by a spline. An arrangement such as this forms a turntable which may be used for depositing thin layers of polymerisable material on supports. The process for reproducing information carriers according to the invention use this simple machine for reproduction.

To this end, a matrix 8 drilled beforehand at its center (this center having been used as center of rotation during recording and, as a result, being determined very precisely in relation to the tracks) is placed on the supporting shaft and rests on the horizontal part thereof. The compound to be deposited is prepared (addition of a hardener) to form the polymerisable material and treated to remove air bubbles, for example by placing it in a vacuum chamber in which a primary vacuum is established. The polymerisable material to be deposited is selected for its properties: it has to adhere to a restricted number of materials which does not include the material forming the engraved part of the matrix.

This compound may with advantage be a silicone rubber elastomer of the type marketed with the corresponding coupling product.

The motor 5 is rotated and drives the supporting shaft carrying the matrix. A few drops of the polymerisable material are deposited on the matrix in the vicinity of the shaft, the entire surface being covered under the effect of the centrifugal force generated during rotation of the matrix. The coating then stabilises to form a layer 12 which fills the hollows of the relief and which is substantially uniform in its external appearance, the important factor being that the entire surface of the matrix is covered.

The layer thus formed does not adhere to the matrix, but follows its relief.

Figure 2:
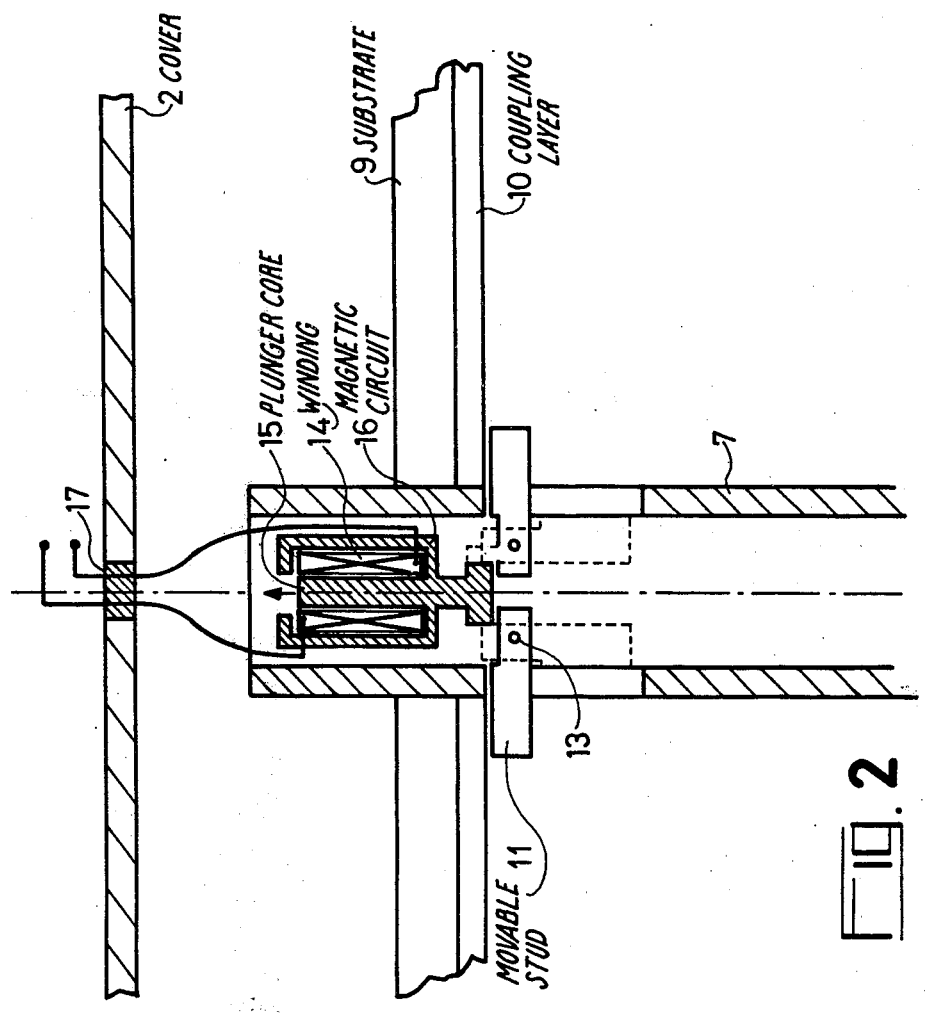
FIG. 2 shows a detail of FIG. 1.

The substrate 9 intended to receive this impression, having been drilled and balanced beforehand, is coated outside the chamber with a coupling layer 10 formed by a material capable of adhering to the resin deposited on the matrix. This substrate covered by its coupling layer is in turn introduced onto the calibrated supporting shaft where it is kept at a distance from the matrix by movable studs 11 which are capable of retracting as shown in FIG. 1 or by a magnetic device in contact with the support which keeps the support at a distance when current is applied to the magnet as shown in FIG. 2.

The supporting shaft and the centering holes in the matrix and the support are very carefully adjusted relative to one another, the connections between these various elements being made rigid by retractable securing pins.

The cover 2 of the vacuum chamber which was removed during all the preceding operations is then replaced. A primary vacuum is established in the chamber by means of openings provided for this purpose. The studs are then retracted by means of a mechanical device (or by interrupting the supply of current to the magnet) and the support is then placed in contact with the matrix coated with the polymerisable material.

Air is then admitted into the chamber, with the result that the support carrying the coupling layer is applied to the matrix carrying the layer of resin. The centering hole of the support is thus precisely centered in relation to the modulation in relief moulded in the layer of resin. This layer of polymerisable material then has to be completely polymerised before the matrix can be separated from the support. The polymerisable layer may have a thickness of from about 1 or 20 μm. The duration of the polymerisation phase will be more or less considerable according to the thickness of the polymerisable layer. The duration of the polymerisation phase may be reduced by accelerating the phenomenon of polymerisation either by heating or by ultra-violet irradiation. This treatment may be carried out either in the same chamber, in which case heating or irradiation means are provided, or outside the chamber. To this end, it is possible to remove from the chamber the supporting shaft carrying the assembly formed by the matrix, the layer of polymerisable material, the coupling layer and the substrate without changing the relative positions of these various elements. This assembly may then be placed in a heating chamber or may be subjected to UV irradiation whilst another matrix mounted on another supporting shaft may be placed in the chamber to effect another reproduction. On completion of polymerisation, separation of the matrix and the support carrying the moulded and polymerised layer is immediate because this layer only adheres to the coupling layer.

FIG. 2 shows in detail an electrical system by which the substrate is kept at a distance from the matrix. The same elements as in FIG. 1 are denoted by the same reference numerals. The movable studs 11 are capable of rotating about their axis of rotation 13 to occupy one of the positions shown in solid or dotted lines. To this end, an electromagnetically controlled relay situated inside the calibrated shaft comprises a winding 14, a plunger core 15 and a fixed part 16 of the magnetic circuit. The control current is applied to the winding by two wires passing through a fluid-tight passage 17. When the current is applied, the plunger core moves in the direction of the arrow and the movable studs rotate about their axis to assume the position shown in dotted lines and to leave a free passage for the substrate 9 provided with its coupling layer 10. A return system (not shown) enables the movable studs to be returned to their upper position.

A process of the type in question for reproducing information-carrying discs may readily be automated. Furthermore, it is possible initially to place on the calibrated supporting shaft the support previously drilled and balanced on which moulding is to be effected, this carrier having been coated with the coupling layer. The carrier is then coated with the layer of polymerisable material over its entire surface. The matrix is then placed on the shaft and held at a distance from the coated carrier. The vacuum chamber is then closed and a primary vacuum is established therein. The matrix is then placed on the polymerisable layer and air is admitted into the chamber. As a result, the matrix and the carrier are applied to one another in the same way as before and all that remains is to await complete polymerisation of the layer of polymerisable resin either by leaving the assemblage in the chamber as such or by subjecting it to UV-irradiation or by removing from the chamber the supporting axis carrying the carrier coated with the coupling layer, the layer of polymerisable resin and the matrix and placing the assembly in a furnace to accelerate polymerisation without modifying the relative positions of the various elements.

The carrier reproduced is thus formed by the flexible or rigid substrate to which is bonded the moulded and hardened polymerisable material carrying the information.

For a disc readable by transmission, the substrate and the resin are transparent and no additional treatment has to be carried out, apart possibly from the deposition of a protective layer on the surface carrying the information.

For a disc readable by reflection, all that remains is to form a reflecting layer of limited thickness following the relief of the resin polymerised on the carrier thus obtained, for example by metallising in vacuo that surface of the carrier which carries the information.

The invention is applicable to the reproduction of any information carrying disc on which the information is recorded in the form of a modulation in relief.

The carrier obtained by the reproduction process according to the invention may also be used as a mould for the production of other copies formed by conventional techniques from various materials, such as polymerisable resins, acrylic resin, epoxide resin or photopolymerisable resin. The matrix from which reproduction by the process according to the invention is carried out thus bears the same relief as the final carrier, in which case the carrier disc obtained by the process according to the invention is a duplicate.

What we claim is:

1. A process for reproducing in a vacuum chamber an information carrying disc from an engraved matrix having a centering hole comprising the steps of:
    covering a substrate having a centering hole with a layer of coupling material capable of adhering to said substrate;
    placing said substrate on a calibrating shaft about said hole;

rotating said shaft and depositing polymerizable material on said coupling layer;

placing a matrix on said shaft having an engraved face facing said polymerizable material and held at a distance therefrom;

establishing a vacuum in said chamber and bringing said matrix and polymerizable material into contact;

admitting air into said chamber;

polymerizing said polymerizable material and shaping said material against said engraved matrix; and separating the matrix and substrate with the polymerized material adhering thereto.

2. A process for producing a vacuum chamber an information carrying disc from an engraved matrix having a centering hole, comprising the steps of:

covering a substrate having a centering hole with coupling material capable of adhering to said substrate and to polymerizable material to form a first assembly;

depositing on said matrix a layer of said polymerizable material incapable of adhering to said matrix to form a second assembly;

supporting said assemblies on a calibrating shaft at a distance from each other;

establishing a vacuum in said chamber;

bringing said assemblies into contact under vacuum so that said coupling material contacts said polymerizable material and said material is shaped against said matrix;

admitting air into said chamber;

polymerizing said polymerizable material; and separating the matrix and the substrate with the polymerized material adhering thereto.

3. A process as claimed in claim 2 wherein said matrix has an engraved face and a non engraved face, is placed first on said supporting shaft, said polymerisable material being then deposited on said engraved face to form said second assembly, said first assembly being then placed on said shaft, said coupling layer and said polymerisable material facing each other.

4. A process as claimed in claim 2 wherein said step of depositing includes depositing a layer of polymerisable material when said shaft is rotating, said layer being thus uniformly deposited.

5. A process as claimed in claim 2 wherein said step of polymerizing includes heating.

6. A process as claimed in claim 2 wherein said step of polymerizing includes subjecting said first assembly to ultraviolet irradiation.

7. A process as claimed in claim 2, including the further step of treating said polymerisable material before depositing to remove air bubbles.

8. A process as claimed in claim 2 wherein said matrix is engraved in duplicate, the information carrying disc obtained being optically readable.

9. A process as claimed in claim 2 wherein said matrix is engraved with the same relief as the support to be read, the information carrying disc obtained being a duplicate from which optically readable discs are formed.

* * * * *